(12) United States Patent
Bryman

(10) Patent No.: US 7,518,117 B2
(45) Date of Patent: Apr. 14, 2009

(54) UNIDIMENSIONAL ARRAY 3-D POSITION SENSITIVE IONIZATION DETECTOR

(75) Inventor: Douglas Bryman, Vancouver (CA)

(73) Assignee: Advanced Applied Physics Solutions, Vancouver (CA)

( * ) Notice: Subject to any disclaimer, the term of this patent is extended or adjusted under 35 U.S.C. 154(b) by 163 days.

(21) Appl. No.: 11/083,304

(22) Filed: Mar. 18, 2005

(65) Prior Publication Data

US 2005/0205796 A1 Sep. 22, 2005

Related U.S. Application Data

(60) Provisional application No. 60/554,346, filed on Mar. 19, 2004.

(51) Int. Cl.
*G01T 1/24* (2006.01)
*G01T 1/20* (2006.01)

(52) U.S. Cl. .............................. 250/370.1; 250/370.11

(58) Field of Classification Search ............ 250/370.11, 250/357.1, 370.1
See application file for complete search history.

(56) References Cited

U.S. PATENT DOCUMENTS

| | | | | |
|---|---|---|---|---|
| 4,353,970 A * | 10/1982 | Dryczynski et al. | ............ | 430/31 |
| 5,382,798 A * | 1/1995 | Mouyen | ................. | 250/370.11 |
| 6,100,532 A * | 8/2000 | Bryman | ...................... | 250/369 |
| 6,100,533 A * | 8/2000 | Martini et al. | ......... | 250/370.01 |
| 6,486,468 B1 * | 11/2002 | Lacy | ........................... | 250/282 |
| 6,614,180 B1 | 9/2003 | Francke et al. | | |
| 6,770,884 B2 * | 8/2004 | Bryman | ...................... | 250/366 |
| 2002/0139935 A1 * | 10/2002 | Klein et al. | ............ | 250/390.01 |
| 2004/0007670 A1 | 1/2004 | Bryman | | |

OTHER PUBLICATIONS

Aprile et al., "The Liquid Xenon Gamma-Ray Imaging Telescope (LXeGRIT) for Medium Energy Astrophysics," SPIE, vol. 2806, pp. 337-348, 1996.*
Bryman et al., "Gated Grid System Used With a Time Projection Chamber," Nuclear Instruments and Methods in Physics Research, A234, pp. 42-46, 1985.*
Elena Aprile et al., "A Liquid Xenon imaging Telescope for 1-30 MeV Gamma-Ray Astrophysics", EUV, X-Ray, and Gamma-Ray Instrumentation for Astronomy and Atomic Physics, SPIE—The Int'l Society for Optical Engineering, vol. 1159, Aug. 7-11, 1989.

(Continued)

*Primary Examiner*—David P Porta
*Assistant Examiner*—Carolyn Igyarto
(74) *Attorney, Agent, or Firm*—Harness, Dickey & Pierce, P.L.C.

(57) ABSTRACT

The present invention provides an improved gamma ray detector module and a method of operating such a detector module for more accurately determining the position of a gamma ray interaction within the detector. The detector module includes an induction array arranged at an offset angle relative other arrays utilized in the detector, whereby the relative timing of the detection of ionization electrons by the induction array and a collector or anode indicate at least one coordinate corresponding to the location of the interaction that produced the ionization electron. This secondary locating apparatus and method supplements or replaces conventional locating apparatus and methods for improving the accuracy or reducing the complexity of the detection apparatus.

20 Claims, 6 Drawing Sheets

OTHER PUBLICATIONS

K. Masuda et al., "A Liquid Xenon Position Sensitive Gamma-Ray Detector for Positron Annihilation," Nuclear Instruments and Methods 188 (1981), pp. 629-638.

K. Masuda et al., "Test of a Dual-Type Gridded Ionization Chamber Using Liquid Xenon," Nuclear Instruments and Methods 174 (1980), pp. 439-446.

Elena Aprile et al., "The Liquid Xenon Gamma-Ray Imaging Telescope (LXeGRIT) for Medium Energy Astrophysics," SPIE, vol. 2806, pp. 337-348.

M. I. Lopes et al., "Positron Emission Tomography Instrumentation: Development of a Detector Based on Liquid Xenon," Departmento de Fisica da Universidade de Coimbra, 3000 Coimbra, Portugal, pp. 675-680.

ISR dated Aug. 12, 2005.

* cited by examiner

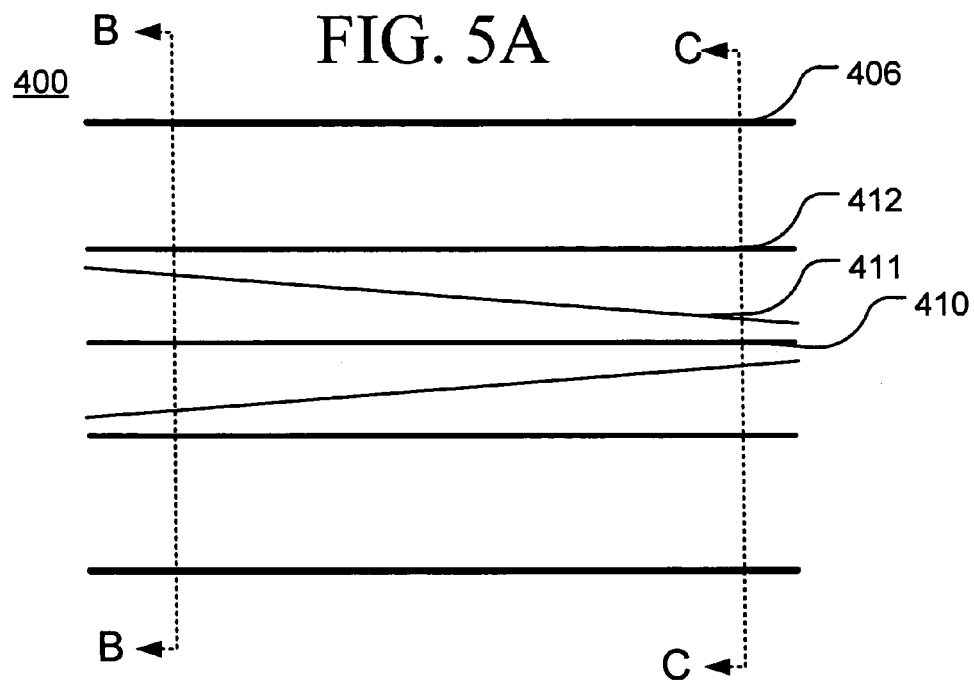
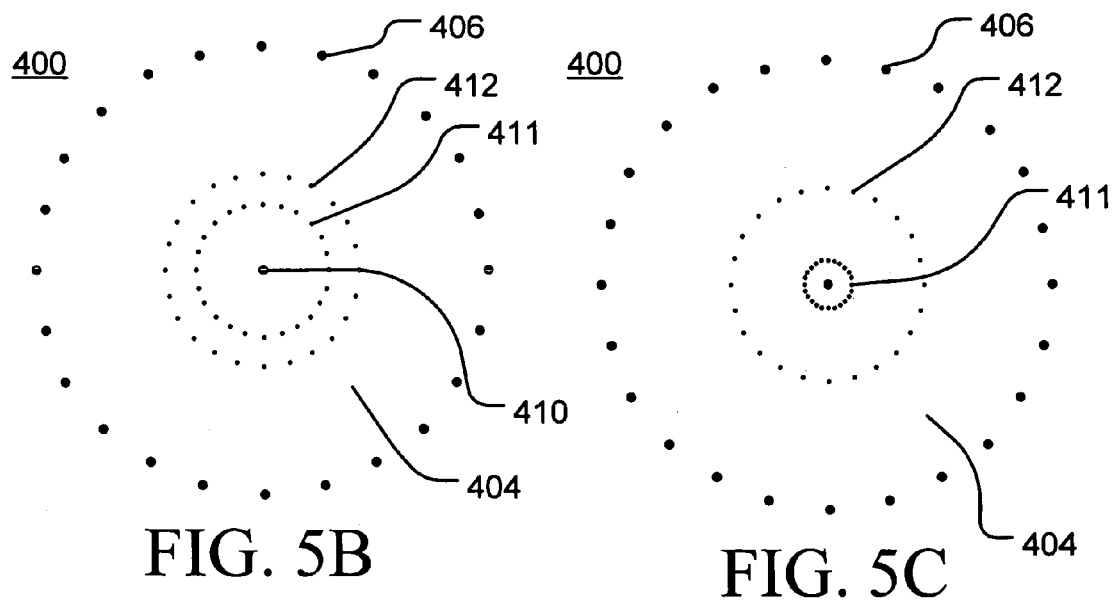

UNIDIMENSIONAL ARRAY 3-D POSITION SENSITIVE IONIZATION DETECTOR

PRIORITY STATEMENT

This application claims priority under 35 U.S.C. § 119(e) to U.S. Provisional Patent Application No. 60/554,346, which was filed on Mar. 19, 2004, the contents of which is incorporated herein, in its entirety and for all purposes, by reference.

BACKGROUND OF THE INVENTION

1. Field of the Invention

The invention generally relates to gamma ray detectors. More particularly, the invention relates to an improved gamma ray detector that can more accurately determine the position of gamma ray interactions within the detector for producing an image of a scanned object.

2. Background

Gamma ray detectors are used in a wide variety of devices and processes including, for example, positron emission tomography (PET), single photon emission-computed tomography (SPECT), contraband explosive detectors, and others. All such devices incorporate detectors capable of determining, with some degree of accuracy, the position of interactions between gamma rays and the detector components. By accumulating position measurement data corresponding to a large number of such interactions, an image of a scanned object from which the gamma rays are being emitted can be produced. These techniques are well known to those of skill in the art and need not be detailed herein.

A difficulty encountered with these detectors is that in order to scan an object efficiently and with sufficient resolution, a multiplicity of such detectors are necessary, and the positions of interactions of gamma rays with the detectors must be determined so that with a plurality of such determinations (typically in the millions) sufficient data is obtained to produce an accurate image of the object being scanned. Because each detector must be capable of generating position data for gamma ray interactions that occur within that detector, the equipment conventionally used in the acquisition of the position data, as well as the subsequent compiling and image generation (e.g., by a computer) tends to require a relatively large and expensive apparatus.

Typically, the collection of detection data by such a detector is initiated by the interaction of a gamma ray with a scintillator material provided within the detector that generates light. By determining in which of the plurality of detectors the light was emitted and the position within the triggered detector from which the light was emitted, a data point presumptively corresponding to a positron annihilation event within the scanned object is collected. By arranging a multiplicity of such detectors around at least a section of the scanned object, a large number of data points can be collected and then subsequently processed by a computer to generate an image corresponding to the collected detector data.

Conventional gamma ray detectors used in such gamma ray scanning devices typically include an expensive scintillating crystalline material (e.g., cerium doped lutetium oxyorthosilicate (LSO) and/or bismuth germinate (BGO)) that will emit light when triggered by a gamma ray. The X-Y position resolution of such detectors is typically on the order of 20 mm$^2$ and tends to exhibit some degree of non-uniformity in this resolution across the detector array. As a result, such detectors have an inherent level of inaccuracy with regard to the precise position (i.e., in X-Y coordinates) at which the interaction occurred. In addition, the depth of the interaction (i.e., the Z coordinate) is generally not determined, or is poorly determined, resulting in a so-called parallax error and further reducing the accuracy of the image generated from the position data.

A modular light signal triggerable detector is disclosed in Bryman's U.S. Pat. No. 6,100,532, entitled "Detector for Gamma Rays" ("Bryman I") which is hereby incorporated by reference in its entirety. Bryman I discloses a gamma ray detector for determining the position of gamma ray interactions. The detector has at least one module, and each module has a converter for converting gamma rays into charged particles. A scintillator material is provided in the detector for emitting light in response to interactions with the charged particles produced by the converter. A photodetector determines when light has been emitted from the scintillator. A two-coordinate position detector is provided for determining the X, Y and Z coordinates of interaction that produced the detected light.

A controller and signal device are associated with the detector for signaling the detection of emitted light within a photodetector and for activating the position detector. The system disclosed in Bryman I addressed some of the deficiencies of the conventional detectors and provided a gamma ray detector that can be constructed less expensively, requires fewer monitoring instruments for acquiring the required positional data, and which can more accurately determine the X, Y and Z coordinates of the gamma ray interaction.

The conversion of gamma rays in material (including heavy liquids like xenon (Xe), krypton (Kr) and other noble gases) and the production of scintillation light and charged products (electrons and positrons) within such materials are well known to those skilled in the art. Further, software tools are readily available to those working in the art for simulating the interactions of gamma rays and charged particles with the detector matter. Position sensitive detectors for charged particles, such as noble liquid ionization chambers, time-projection-chambers (TPC), and light detection arrays are commonly used instruments having position and energy resolution capabilities that can be similar to those obtained by the apparatus disclosed in more detail below.

Liquid Xe position sensitive ionization detectors with grids such as described by K. Masuda et al., A Liquid Xenon Position Sensitive Gamma-Ray Detector for Positron Annihilation Experiments, Nucl. Instr. Meth. 188 (1981) 629-38; and K. Masuda, et al., Test of a Dual-Type Gridded Ionization Chamber Using Liquid Zenon, *Nucl Instr. Meth.* 174 (1980) 439-46, each of which is hereby incorporated by reference in its entirety, may be configured to provide sub-millimeter position resolution for low energy gamma rays. Gated time projection ionization chambers (a gas drift device) have been reported. The Columbia University, for example, has disclosed a liquid Xe TPC (E. Aprile, et al., The Liquid Xenon Gamma-Ray Imaging Telescope (LXeGRIT) for Medium Energy Astrophysics, *Proceedings-SPIE The International Society For Optical Engineering*, SPIE Vol. 2806, pp. 337-48, which is hereby incorporated by reference.

It has also been reported that one of the disclosed embodiments of a liquid Xe ionization TPC achieved a 1 mm position resolution and energy resolution of 5.9% for gamma rays exhibiting 1 MeV energy. Additionally, Lopes et al. have reportedly constructed a liquid Xe ionization detector capable of a transaxial positioning resolution of 1 mm, a depth of interaction resolution of 5 mm, a coincidence time resolution of 1.3 ns, energy resolution at 511 keV of 17% and efficiency of 60% (see, M. Lopes, et al., Positron Emission Tomography Instrumentation: Development of a Detector Based on Liquid Xenon, *Proc. Calorimetry in High Energy Physics*, pages 675-80 (1999)), which is hereby incorporated by reference in its entirety.

These and other articles present various configurations of instrumentation for collecting ionization signals using pads and wires, gating grids and scintillator triggers that are applied to the problem of measuring charged particle trajectories. These instruments tend to use scintillation light primarily as a fast indicator that a suitable interaction event has occurred, but do not tend to specifically localize the point of interaction.

In the KAMIOKANDE (as described in K. S. Hirata et al., Experimental Study of the Atmospheric Neutrino Flux, PHYSICS LETTERS B, Vol. 205, number 2,3, p. 416-20 (1988)) and other detectors, arrays of photodetectors provided at the surface of light-emitting liquids and/or solids have been used to localize the position of interactions of gamma rays and charged particles. In L. Barkov et al., Search for $\mu^+ \to e^+\gamma$ down to $10^{-14}$ branching ratio, Paul Scherer Institute proposal. R-99-05.1 (1999), which is hereby incorporated by reference in its entirety lepton-flavor-violating decay $\mu^+ \to e^+\gamma$ was studied using a liquid Xe scintillation detector having an array of photo-multiplier tubes surrounding a small volume was demonstrated to give 8 mm full width half maximum (fwhm) position resolution for 1 MeV gamma rays.

SUMMARY OF THE INVENTION

The present invention provides an improved detector that combines features of several of the conventional detectors described above to produce individual elements for use in detector modules. These elements can then be arranged in a wide variety of specific detector modules and arrays for providing improved detection of low energy gamma rays.

Accordingly, exemplary embodiments of the present invention include improved gamma ray detector modules that can more accurately determine the position of a gamma ray interaction within the detector, the method comprising: emitting light in a medium in response to an interaction between a gamma ray and the medium; determining when light has been emitted from the medium and a three-dimensional position of the interaction using a plurality of photodetectors; producing a drift field in the medium that directs ionization electrons resulting from the interaction to a collector; and determining a precise three-dimensional position of the interaction by localizing the position of the interaction in two dimensions in the collector based on the position of the ionization electrons in the collector and determining a third dimension based on a time of arrival of the ionization electrons relative to when the light is detected.

Another exemplary embodiment of the invention provides an improved gamma ray detector for determining the position of gamma ray interaction comprising: an active region containing a medium for emitting light and ionization electrons in response to an interaction between a gamma ray and the medium; a plurality of photodetectors to determine when light has been emitted from the medium and a three-dimensional position of the interaction; a collector that is used to determine a precise three-dimensional position of the interaction by localizing the position of the interaction in two dimensions in the collector based on the position of the ionization electrons in the collector and a third dimension based on a time of arrival of the ionization electrons relative to when the light is detected; wherein the collector is arranged at an acute angle relative to the movement of the ionization electrons and a plurality of field wires to produce a drift field in the medium that directs the ionization electrons resulting from the interaction to the collector.

Further scope of the applicability of the present invention will become apparent from the detailed description provided hereinafter.

However, it should be understood that the detailed description and specific embodiments, while disclosing exemplary embodiments of the invention, are provided by way of illustration only and that various changes and modifications coming within the spirit and scope of the invention will become apparent to those skilled in the art from the detailed description which follows.

BRIEF DESCRIPTION OF THE DRAWINGS

The invention will become more apparent by describing in detail exemplary embodiments thereof with reference to the attached drawings in which:

FIGS. 5A-5C illustrate a second exemplary embodiment of the invention; and

Figure 1A:
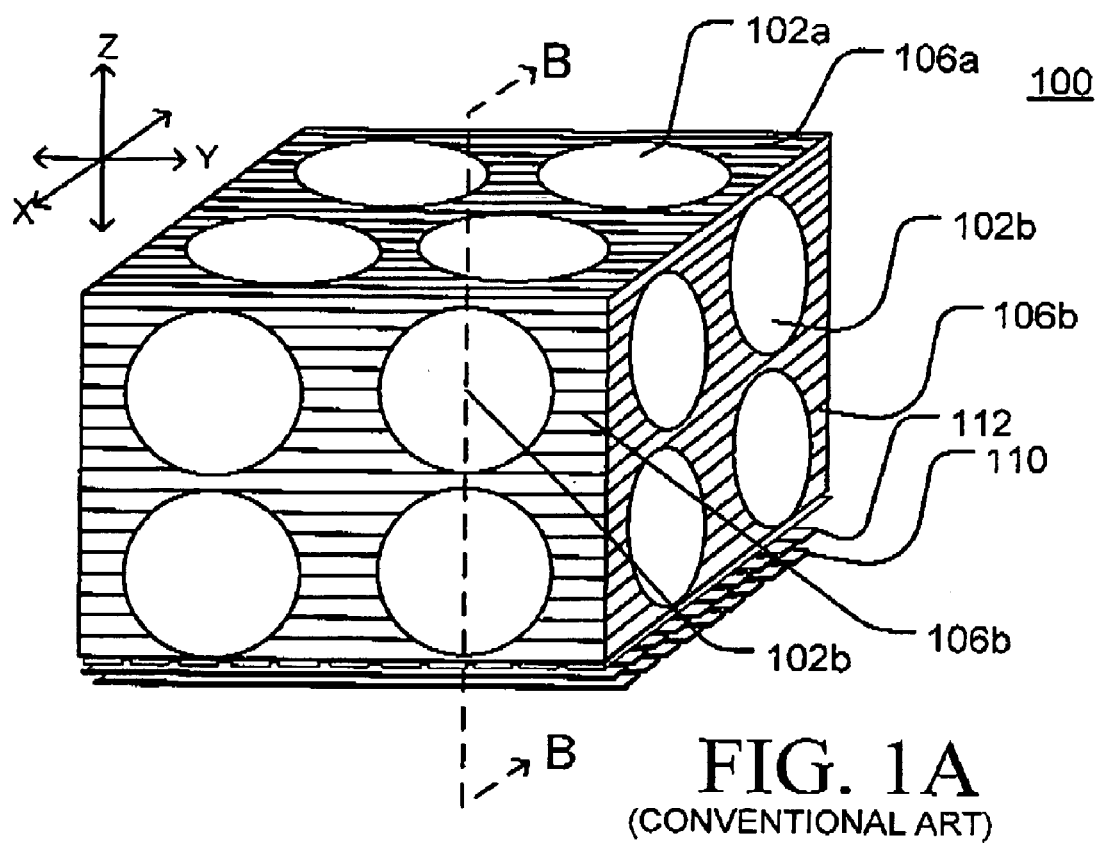
FIGS. 1A and 1B illustrate an orthogonal and cross-sectional view, respectively of an earlier gamma ray detector structure.

These drawings have been provided to assist in the understanding of the exemplary embodiments of the invention as described in more detail below and should not be construed as unduly limiting the invention. In particular, the relative spacing, positioning, sizing and dimensions of the various elements illustrated in the drawings are not drawn to scale and may have been exaggerated, reduced or otherwise modified for the purpose of improved clarity.

DESCRIPTION OF EXEMPLARY EMBODIMENTS

Another aspect of the present invention permits the materials, dimensions and detector types used to be tailored for a large range of gamma ray energy and exposure applications. The high speed of the scintillation light signal in noble liquid materials and other materials and the fast position-sensitive trigger selectivity is suitable to high rate applications involving coincident signals occurring in other detector modules.

The above-mentioned aspects and other novel aspects of the present invention are further described below. Well known elements, devices and processes will not be described in detail in the following description as those skilled in the art will readily understand the invention without the distraction of a rendition of non-essential information.

A triggerable detector for measuring the energy, position of interaction in three dimensions, and the angle of emissions of low energy gamma rays is described herein. The detector comprises an ionization chamber in which gamma rays produce ionization and the positions of the ionization, including multiple interactions, is measured in three dimensions. A shutter system comprising a set of grids or electronic shutters is provided to admit drifting ionization electrons during limited times and over a limited spatial extent. Such systems may also be operated without shutter systems wherein data is recorded substantially continuously and selection of appropriate data relationships is made in off-line analysis. A triggering system based on scintillation light signals may also be provided that localizes the positions and energy deposits of the ionization at the times of interaction for triggering the ionization detector and for measuring the total energy deposited by the gamma ray interaction. The position localization information may also be employed in off-line analysis to correlate the light signals and ionization signals.

The ionization detector material may include a liquid or gas such as Xenon (Xe), Krypton (Kr), or Argon (Ar), for example, in which detectable scintillation light is produced promptly when ionization occurs and in which ionization electrons drift under applied electric fields with little attenuation or disturbance to collection electrodes in a collector. A position-sensitive array of photodetectors views the entire ionization detector and feeds a triggering system for the ionization detector that selectively activates it in space and time and provides an additional measure of the energy of the interaction. Since all three dimensions of the interaction point are measured simultaneously with comparable resolution a precise position of the interaction is measured (e.g., approximately 1 mm or less in all three dimensions) and parallax errors are largely absent.

Gamma rays convert to charged particles (pair production or Compton scattering) in the detector medium/material and the interaction is detected first by the photodetectors. A triggering system (e.g., a logic array) selectively takes the pattern and signal size of the photodetectors fired, and opens only the shutter region in which the ionization occurred and only at the time expected for the ionization electrons to arrive. The two-dimensional collection electrode array accurately localizes the position of the ionization.

The third dimension is determined by the precise time of arrival of the ionization relative to the scintillation signal time (i.e., when the light signal activates the photodetectors). The collected ionization signal determines the energy deposited by the gamma ray interaction. Additional information on the energy deposit is provided by the size of the collected light signal. The above-described procedure thereby activates only a small region of the collection electrode array for a limited period. Thus, only one set of readout elements is required to instrument the entire position sensitive array of the detector regardless of the size of the detector. Pile-up of other interaction signals is limited to the trigger selection region and the open timing period of the shutter. Therefore, high rates of interaction and coincidence of related signals in other detectors can be accommodated without degradation of performance.

In addition to detecting the position and energy of single interactions of gamma rays, multiple interaction events, such as contained Compton scatters, can be used to obtain the direction of individual gamma rays. In this mode, multiple coincident triggers will be used to activate more than one region of the detector so a complete history of the event can be recorded resulting in reconstruction of the angle of the gamma ray.

Figure 1B:
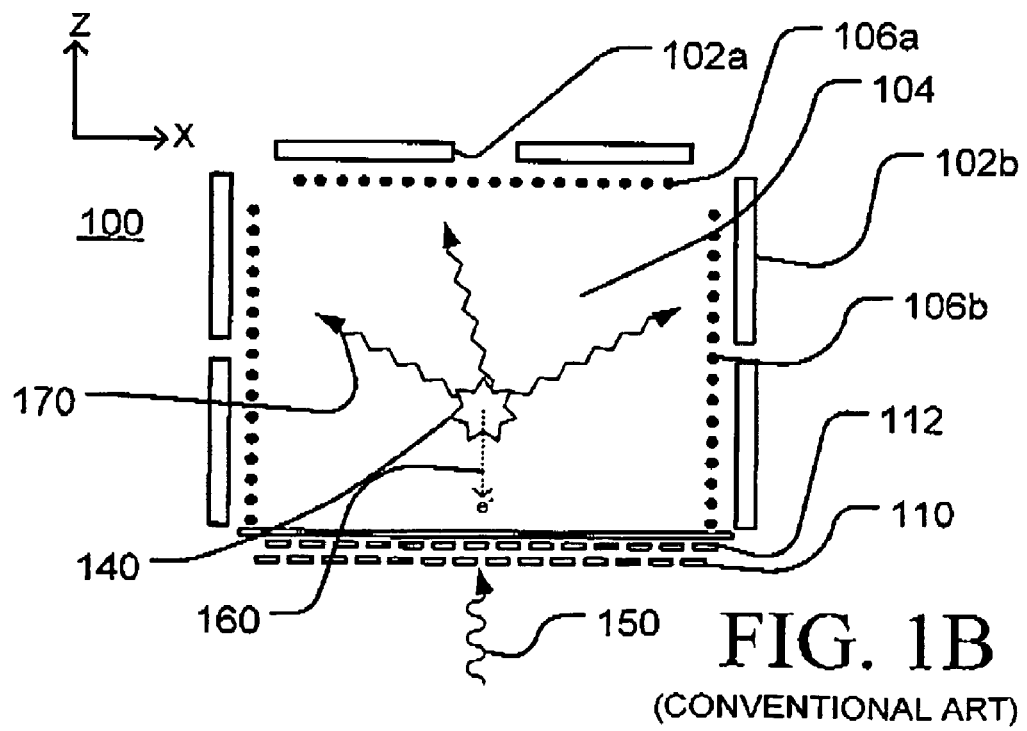

FIGS. 1A and 1B illustrate a detector module 100 according to an earlier detector design. A time projection ionization chamber is shown that is gated (e.g., by the opening and closing of the shutters) by a position sensitive signal derived from an array of photodetectors 102a, 102b. The gamma ray 150 interacts with a medium (e.g., liquid xenon) contained in the active region 104. In this embodiment, the medium serves as a fully active converter, an optical transmission medium and an ionization drifting medium.

Those skilled in the art will appreciate that the active region can contain other liquid or gas mediums that meet these requirements. Scintillation light from the interaction 140 is detected by the array of photodetectors 102a. 102b (e.g., photo-multiplier tubes) provided around the ionization chamber on at least several sides. The photodetectors 102a, 102b measure the energy of the interaction 140 (for event selection) which is proportional to the light signal (i.e., emitted light 170). A rough three-dimensional position of the interaction 140 is determined by the distribution of the light signals within the array.

Alternatively, a difference of times at which the emitted light from the interaction 140 arrives at the plurality of photodetectors 102a, 102b (e.g., photodetectors provided on opposite sides and/or adjacent photodetectors provided on a single side) can be used to determine the three-dimensional position of the interaction 140. The difference between the times of arrival, of the light at the plurality of photoderectors 102a, 102b can be used to obtain the three-dimensional position of the interaction 140 with comparable precision to that found from the distribution of the light itself. For example, since light travels at a relatively slow speed of $1.9 \times 10^{10}$ cm/s in liquid Xe, a timing resolution of 0.1 ns could be sufficient to provide a position resolution of 2 cm.

Further, those skilled in the art will appreciate that a combination of the two methods can be used whereby distribution of the emitted light detected by the plurality of photodetectors 102a, 102b and the differences in arrival time of the light measured at separated photodetectors can be used to determine the rough three-dimensional position of the interaction 140 that emitted the detected light. An example of a system using both time of arrival and energy requirements in a large scintillator detector is provided by A. Aguilar; LSND Collaboration, Evidence for neutrino oscillations from the observation of . . . ," *Phys. Rev. D*, Vol. 64(11): 112007, (2001) which is hereby incorporated by reference in its entirety.

In addition to producing scintillation light (i.e., emitted light), a electron positron pair (or Compton electron) produced in the material during the conversion of the gamma ray 150 ionizes a portion of the medium, thereby producing free ionization electrons. These ionization electrons may be urged to drift in a desired direction toward a collector assembly 110 under an applied electric field imposed on the ionization chamber. The drift field can be imposed by a set of drift field wires 106a, 106b that are sized and arranged to limit any shielding of the photodetectors from the light signal. For example, a drift field in liquid xenon of about 1 kV/cm will result in ionization electrons drifting at a speed of 0.2 cm/ps. At that drift speed, a 10 cm drift distance would correspond to a "memory" time of about 50 µs for the detector chamber.

Because the drift field can affect the scintillation light output, the magnitude and direction of the drift field may be adjusted for better suiting a particular application. Those skilled in the art will appreciate that the previous example is for purposes of illustration and not limitation. Accordingly, other combinations of drift field intensity, medium used, and chamber size can, and generally will, alter the "memory" time provided by a particular design.

Before reaching the collector 110, the ionization electrons pass through a shutter system 112 (e.g., two orthogonal arrays of gating wires), which is usually biased to block the passage of the ionization electrons to the collector 110. When a gamma ray 150 interacts with the medium and emits light, the photodetectors 102 fire and a triggering system localizes the position of the interaction 140. The associated shutter region in the shutter system 112 centered on the scintillation light localizes the interaction point in the two dimensions transverse to the gamma direction (e.g., X and Y). This region is switched from a blocking state to a transmitting state (i.e., one that will permit the passage of the ionization electrons) for a predetermined time interval. The time interval is dependent on the localization of the coordinate along the gamma ray 150 direction (e.g., the Z direction). In this way, the shutters of the shutter system 112 in the desired region is open for a limited period (e.g. for approximately 5 μs for the drift velocity above and assuming a Z position localization interval of 1 cm), thus limiting the possibility of accidental pile-up of unwanted signals.

The collector 110 (e.g., collection electrode array/collector pads) is used to determine both coordinates of the gamma interaction P transverse to the gamma direction. This collector 110 may include an array of collector pads of a size consistent with the desired position resolution in which the ionization is directly detected. Each pad can be connected to an amplifier (not shown) and an electronic circuit that continuously samples the energy collected, as is well known in the art. For example, pads of dimension 1 mm.times. 1 mm would give position resolution of <1 mm (fwhm) using single pad or multiple pad events in which the ionization is detected by more than one pad.

Alternately, the X-Y positions can be determined by a charge induced on an array of orthogonal wires placed between the shutter grid and the collector 110. Wires spaced at 3 mm, for example, in which the induced signal is spread over several wires would be expected to yield a position resolution of <1 mm using interpolation of the signal sizes to determine the centroid, as is well known in the art. Further, those skilled in the art will appreciate that other similar techniques are in common usage and may be applied.

The time of arrival of the signal at the collector 10 or signal wires relative to the trigger time gives the vertical position (Z) or the depth of the interaction of the gamma ray, since the drift velocity is constant and known. As previously discussed, the drift velocity can be determined as required for the specific medium and size of the module and is controlled by the drift field wires 106.

The collector 110 (e.g., collector pads or signal wires) can be instrumented in several modes depending on performance and cost requirements. For example, in a first mode, analog pulse height information can be obtained using analog-to-digital converters (ADCs). In another mode, the pattern of hits above a set threshold can be obtained using discriminators to provide the "address" of the elements fired. Still Another approach to instrumentation is to use flash ADCs, charged-coupled-devices (CCDs) or switched capacitor arrays to readout the signals in discrete time segments. This simultaneously provides all three coordinates by readout of the individual signals.

Since the shutters open selectively only for the rough position and time of arrival of the ionization, essentially activating only a small segment of the detector for any individual event, the numbers of channels of electronics instrumentation required for the ionization signal elements can be drastically reduced. For instance, in the case of pad collectors mentioned above, there would be 100 pads/cm$^2$, requiring about 105 pads for a detector subtending a 30 cm×30 cm area. However, the scintillation light localization within an X-Y region of, for example, 2 cm×2 cm, would allow the entire detector to operate with as few as 400 electronics channels. In this example, there would be one common set of electronics for every 20$^{th}$ collection pad in the X and Y directions. Since, within the resolution of the triggering system, only one of these would normally have a signal, there would be little interference.

Figure 2:
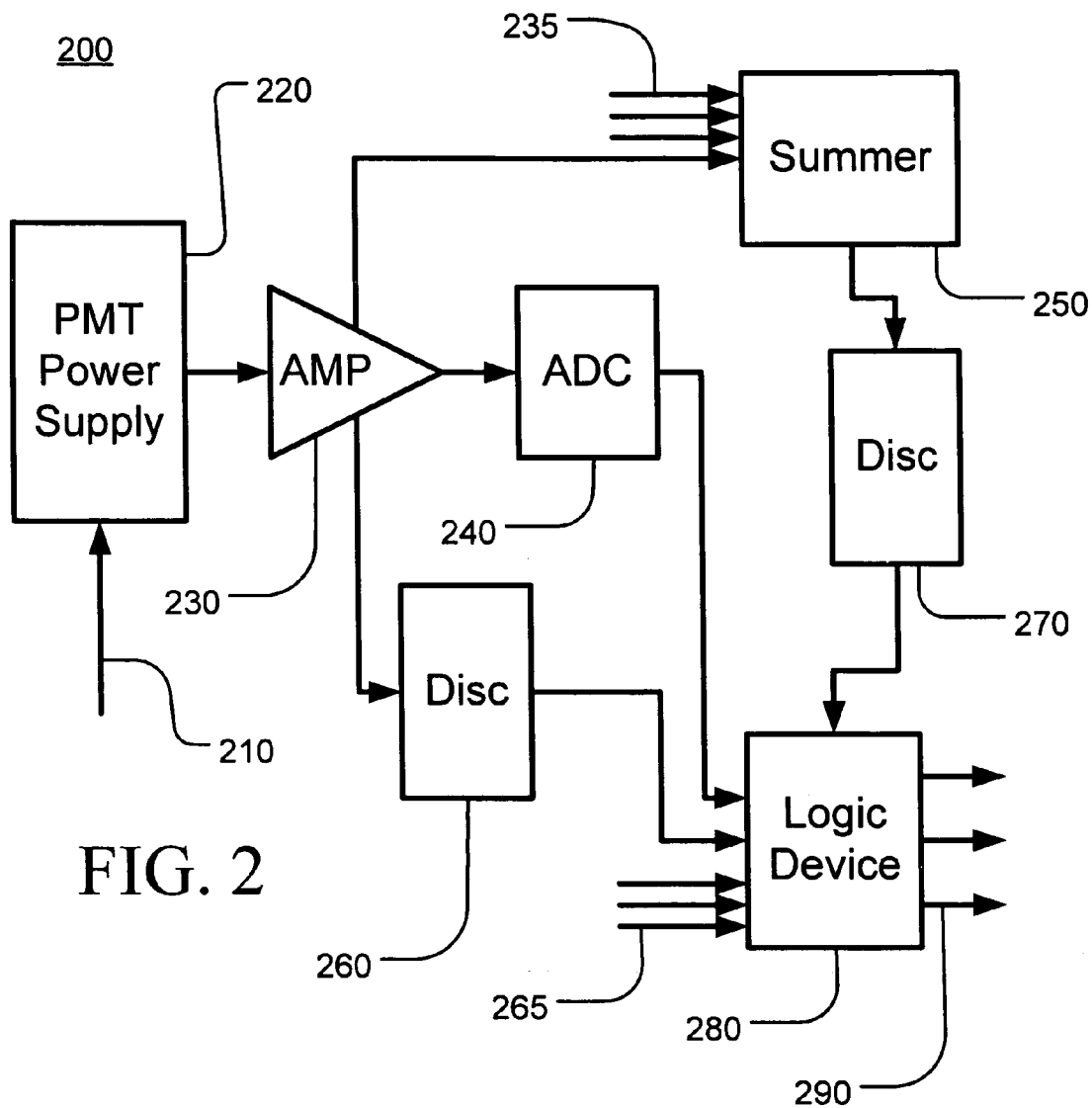
FIG. 2 provides a schematic representation of the functioning of an apparatus incorporating a number of detector elements.

FIG. 2 illustrates a block diagram for a triggering system according to the present invention. The triggering system 200 will be described in relation to the above-described embodiment for clarity; however, those skilled in the art will recognize many equivalent variations that achieve the same functional objectives. Referring to FIG. 2, signal 210 is the light emitted from the interaction of the gamma ray and the medium (e.g., scintillation of the liquid xenon). The photodetectors (e.g., photo-multiplier (PMT)/power supplies) 220 detect the light signal 210. The photo-multiplier (PMT)/power supplies 220 convert the light signal 210 into an electrical signal, which is fed to amplifier 230. The amplified signal from amplifier 230 is fed to ADC 240, analog summer 250 and discriminator 260. The analog summer 250 also receives inputs 235 from adjacent photodetectors.

The output of the analog summer 250 is fed to another discriminator 270. The ADC 240 output, and signals from discriminators 260, 270 are sent to the logic device 280. The logic device 280 then sends output signals 290 to generate open or closed signals for the appropriate region of the shutter system. Additionally, logic device 280 receives signals 265 from other triggering systems that are used in the determination of the appropriate region of the shutter system to activate (e.g., using the distribution, time of arrival or both, as described above). Those skilled in the art will appreciate that many variations to the specific triggering system 200 described above are readily recognizable.

For example, after the analog to digital conversion, the digital signal can be supplied to an application specific integrated circuit (ASIC), programmable gate array (PGA), or other processor for determining which of the shutters should be activated in response to the detected light signal. It will be appreciated that the simplified block diagram of the triggering system detailed above does not reflect all of the components, configurations or complexity of a functional system. A more detailed description of such systems is provided in Bryman et al, Gated Grid System Used with a Time Projection Chamber, *Nuc. Instr. Meth. In Physics Res*. A234, pp. 42-46, (1985) which is hereby incorporated by reference in its entirety.

The intrinsic resolution of the position sensitive detector depends on the readout electronics (time resolution) for the Z coordinate (drift) direction and on the segmentation and readout method for the horizontal X-Y direction in addition to such effects as diffusion and signal amplitude. The intrinsic timing resolution requirements indicated above may easily be met since the light signal from liquid noble material detectors is known to be fast (typically 1 ns), as compared to the relatively slow drift time (e.g., 0.2 cm/μs). Further, diffusion effects are known to be small. If less precise position resolution, for example 1 cm resolution, was sufficient for a particular application, the system can be simplified by reducing the number of readout channels required or localizing the interaction position using only the emitted light signal. Conversely, improved sub-millimeter resolution could be achieved by increasing the degree of segmentation and the number of readout channels monitored to a point where the primary limitation to the resolution was diffusion effects.

The efficiency of the detector is also a function of the thickness of the active ionization layer. For example, for 511 keV gamma rays, an active ionization layer of about 10 cm of liquid Xe can achieve approximately 95% conversion efficiency.

Additionally, those skilled in the art will appreciate that methods for determining the position of a gamma ray interaction are disclosed from the foregoing description. An exemplary method for determining the position of a gamma ray interaction comprises emitting light in a medium in response to an interaction between a gamma ray and the medium. A plurality of photodetectors is used to determine when the light has been emitted from the medium and a first (i.e., rough) three-dimensional position of the interaction. A drift field is produced in the medium that directs ionization electrons resulting from the interaction to a collector. Finally, a second (i.e., precise) three-dimensional position of the interaction is determined by localizing the position of the interaction in two dimensions in the collector based on a position of the ionization electrons collected in the collector and determining a third dimension based on a time of arrival of the ionization electrons relative to when the light is detected.

As described above, a portion of a shutter system may be opened at the appropriate time corresponding to the interaction. Those skilled in the art will appreciate that the portion is defined by the projection of the position of interaction 140 in the X-Y plane of the collector as shown in FIGS. 1A and 1B, for example. The shutter selectively blocks and permits the passage of the ionization electrons to the collector. Also, since a first three-dimensional position is determined, the time of arrival of the ionization electrons at the collector can also be roughly determined, thereby allowing for opening the shutter system only during a period when the ionization electrons 160 associated with the interaction 140 are expected to arrive. Thus, the distance from the collector to the interaction may be determined as a function of the elapsed time from when the light 170 is detected to when the electron 160 arrives at the collector 110. The same selection process may also be used in the absence of a shutter when the data is analyzed off-line.

The choice of materials and dimensions used can be determined to be appropriate for each application. Converter and detector materials other than liquid or gaseous xenon or krypton can be used. Alternatives to the position sensitive detectors described above, can include any type of signal collector (including ones with gas gain, for example), ionization devices including multi-wire proportional detectors (with individual wire readout, cathode strip or pad readout and delay-line readout, for example), micro-strip or micro-gap chambers, time-projection-chambers, micromegas, and the like.

Further, any type of photodetector such as photomultiplier, position-sensitive photomultiplier, photodiode, avalanche photodiode, hybrid photodiode, visible light photodetectors (e.g., VLPC), and the like can be used to provide the position sensitive-trigger-information.

Figure 3:
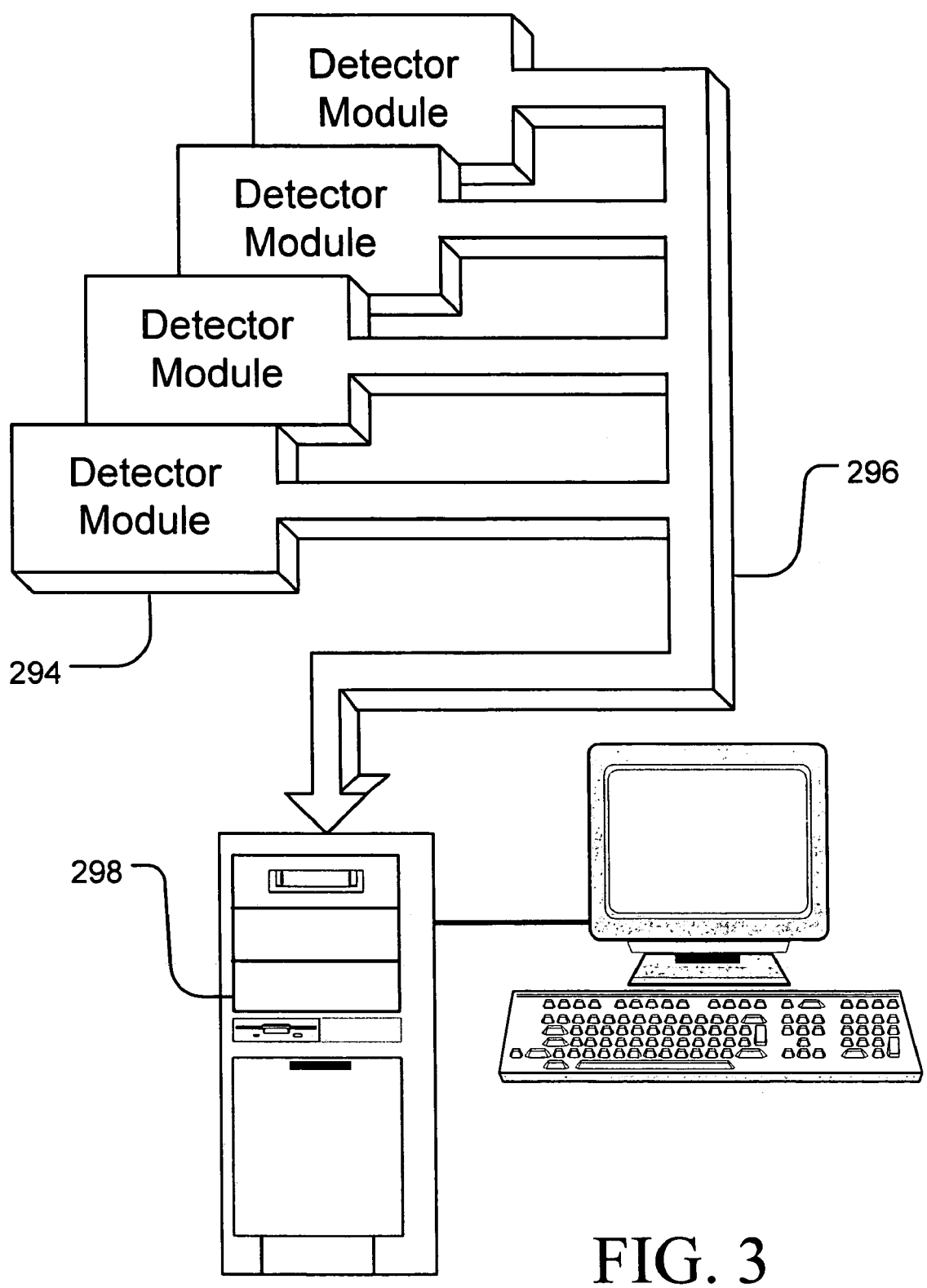
FIG. 3 provides a second schematic representation of the configuration of an exemplary system for collecting detector data from a plurality of detector modules.

Additionally, as shown in FIG. 3, the system can be structured to operate in an off-line mode. In this particular arrangement, the use of the shutter system is not required. Therefore, manufacturing costs and complexity of the individual of the detector modules 294 could be reduced. However, a processor 298 is used to perform the necessary calculations on the data 296 from the modules 294 to determine the precise three-dimensional location of the interaction of the gamma rays with the medium. Those skilled in the art will appreciate that without the shutter system the amount of erroneous data collected by the collector may be greatly increased. Therefore, the data collected from the plurality of photodetectors and the collector is processed off-line to determine the precise location in three dimensions of the interaction which was detected by the photodetectors.

The off-line processing preferably includes filtering operations and other calculations to mathematically remove the extraneous data collected by the collector. Those skilled in the art will appreciate that using data from the photodetectors a window can be determined that contains the position and time of arrival at the collector of the desired signal (i.e., the ionization electrons generated from the interaction). Then, this window can be refined using conventional signal processing techniques to determine the precise position (i.e., the X and Y position) and time of arrival at the collector, as will be appreciated by those skilled in the art. The third dimension (i.e., the Z position) is then determined using the difference between the time the interaction was detected by the photodetectors and the time of arrival at the collector and the drift velocity of the ionization electrons in the medium, in a conventional manner.

Further, as shown in FIG. 3, data 296 can be collected from multiple detectors 294 and processed in a common processor 298. Still further, those skilled in the art will appreciate that the processor can be any device suitable to perform the processing of the data as described above. For example, the processor 298 can be a general-purpose computer, an application specific device, hardware/software integrated into an imaging system, a distributed processing system and the like.

Figure 4A:
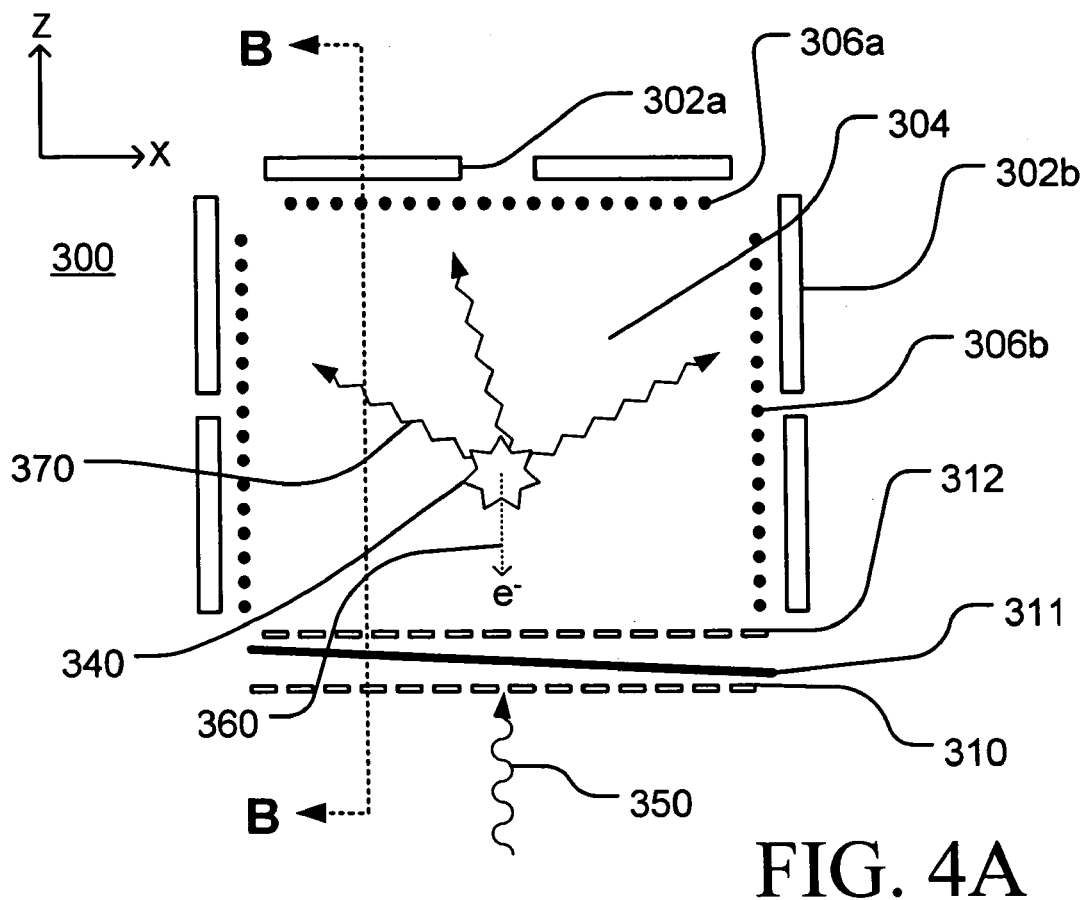
FIGS. 4A and 4B illustrate an exemplary embodiment of the invention.
Figure 4B:
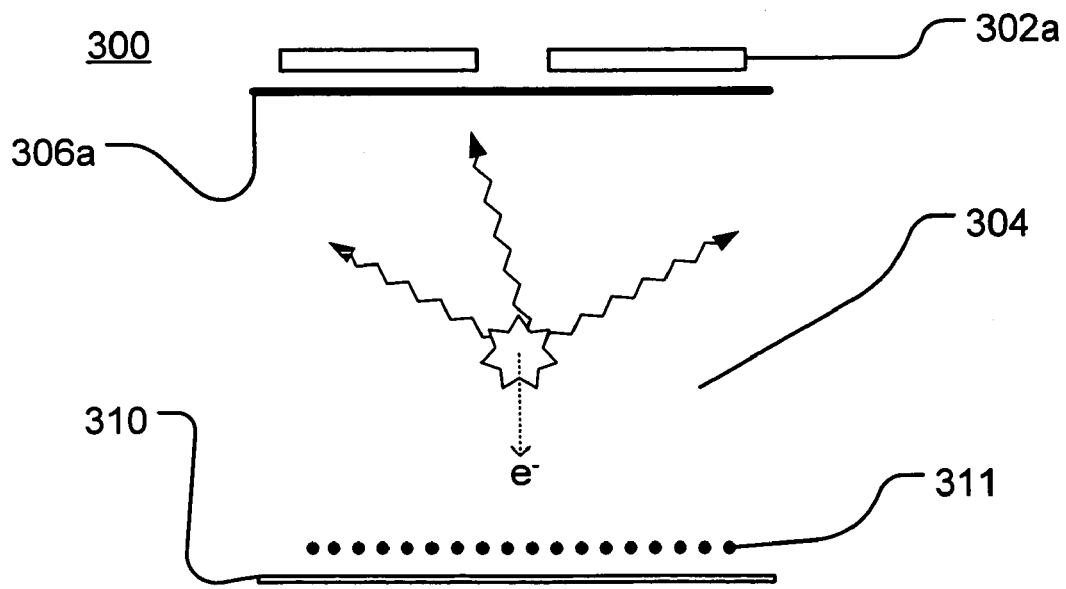

FIGS. 4A and 4B illustrates an exemplary embodiment of the improved detector module 300 having a time projection ionization chamber (TPC) gated by a position sensitive signal derived from an array of light sensors 302a, 302b that is similar in some respects to the detector module described in the inventor's U.S. Pat. Appl. Pub. 2004/0007670 ("Bryman II") and discussed above in connection with FIGS. 1A and 1B. As illustrated in FIGS. 4A and 4B, a gamma ray 350 converts in a material contained within the detector 304, such as liquid xenon, the material being selected to serves as a fully active converter, an optical transmission medium and an ionization drifting medium. Scintillation light 370 from the interaction 340 is detected by an array of photodetectors 302a, 302b (e.g., photo-multiplier tubes) arranged around the ionization detector on several surfaces. The photodetectors allow the energy of the interaction (for event selection) to be estimated as proportional to the detected light signal 370. The position of the interaction 340 may also be determined by evaluating the relative timing of the light as it reaches various of the photodetectors provided in the array.

In addition to producing scintillation light, the gamma ray interaction 340 ionizes the material within the detector, such as liquid xenon, thereby producing free electrons 360. By establishing an electric drift field in the material, the free electrons can be propelled toward the collection region 310 of the ionization chamber. The drift field is provided by sets of electrodes 306a, 306b that are sized and arranged so to allow a majority of the scintillation light to pass through the electrodes and reach the photodetectors 302a, 302b. A drift field in liquid xenon of, for example, 1 kV/cm will cause the ionization electrons to drift at a speed of about 0.2 cm/µs. Accordingly, a detection chamber having a 10 cm depth would provide a maximum "memory" time of about 50 µs. Before reaching the collection region 310 the ionization electrons 360 may pass through a shielding grid and shutter system 312 as generally described in Bryman II.

In previously described implementations of similar ionization detectors such as those described in the Bryman II based on E. Aprile et al.'s disclosure in SPIE, 2806:337 et seq. (1996) ("Aprile I"), the disclosure of which is hereby incorporated by reference in its entirety, after passing through the shielding grid and/or a shutter system or array, the ionization electron would pass through a pair of orthogonal induction grids that would allow measurements of two coordinates. As illustrated in FIGS. 4A and 4B, however, in an exemplary embodiment of the present invention, after passing through the shielding grid 312, the ionization electron is detected by a single induction grid 311 that is positioned between and oriented at a small angle with respect to the substantially planar and parallel orientation of the shielding grid and a collector anode 310 arranged on opposite sides of the induction grid. Additional background on the use of liquid xenon detectors is provided in Aprile et al.'s, A Liquid Xenon Imaging Telescope for 1-30 MeV Gamma-Ray Astrophysics, SPIE, 1159: 295-305 (1989) ("Aprile II") the disclosure of which is hereby incorporated by reference in its entirety.

The single array 311 may be oriented parallel to the X-Z plane and is used to precisely determine two coordinates of the gamma interaction transverse to the drift (Z) direction (upwards in FIG. 1). The Y position (orthogonal to the wire direction) of the drifting ionization can be determined by the distribution of charge induced on elements of the array 311. While the shielding grid 312 and anode 310 are parallel to each other (in X-Y planes orthogonal to the drift direction, Z), the elements of the induction grid 311 are arranged at a small angle offset from parallel (in the X-Z plane) between them. Wires spaced at 3 mm, for example, in which the induced signal is shared by at least two wires would be expected to yield an X spatial resolution of <1 mm using interpolation of the signal sizes to determine the centroid of charge. This technique is discussed in more detail in Aprile I.

Because the distance from the induction grid 311 to the shielding grid 312 and from the shielding grid to the anode array 310 varies along the X direction, the time difference between ionization electron signals detected on the induction grid and the anode will also vary. This time variation will correlate to a particular X position (along the direction of the induction wires) with high spatial resolution. For instance, a slope of 0.01 radians (r) between the induction grid 311 and the anode array 310 would result in a drift path time difference of 200 ns over a distance of 10 cm, thus, a difference time resolution on the order of 2 ns would provide a position resolution of about 1 mm.

In addition, the shapes and amplitudes of the induced pulses will vary with X position giving an alternate measure of the X position of the ionization. Thus, a single one-dimensional induction array 311 can be utilized to provide improved two dimensional spatial resolution in two dimensions. The time of arrival, $t_a$, of the ionization electron signal 360 at the anode or induction wires (after suitable calibration) relative to the trigger time (derived from the photodetectors' detection of the corresponding light signal) translates into the vertical position (Z) or the depth into the scintillating material of the interaction of the gamma ray because the drift velocity under the imposed direct field is known or may be determined.

FIGS. 5A-5C illustrate an alternative exemplary embodiment in which the detector exhibits a substantially cylindrical geometry implementation of the improved ionization detector concept. In this example, a single anode wire 410 is surrounded by, for example, a plurality of induction wires 411 that are themselves surrounded by a shielding array 412. A cathode array 406 surrounds the shielding array 412 and can be used to establish a drift field with an active drift region between the cathode array and the shielding array. As in the TPC example above described in connection with FIGS. 4A and 4B, the anode wire 410 is preferably parallel to and, in this instance, centered, the shielding array 412. The wires comprising the induction array 411 however, are arranged in a "fanned out" or angled orientation relative to the orientation of both the anode and shielding array conductors. As illustrated in FIGS. 5B and 5C, illustrating cross-sections taken at lines B-B and C-C on FIG. 5A respectively, this offset orientation varies the radial separation between the wires of the induction array 411 and the anode conductor 410 along the cylindrical axis of the detector 400.

In the exemplary embodiment illustrated in FIGS. 5A-5C, the time of drift (between the scintillation signal and arrival of an electron at the anode wire) corresponds to the radial coordinate (r) of the interaction and the distribution of induced charge measured on the induction wires gives the angle φ (in cylindrical coordinates). The variation in the time difference between detection at an induction wire and detection at the anode corresponding to the position of the interaction position of the ionization along the wire (Z in cylindrical coordinates). Small corrections resulting from variations in drift field can be easily accommodated. As in the TPC case detailed above, the shapes and amplitudes of the induced pulses will vary with Z position of the interaction, thereby providing an alternate mechanism for determining the Z position.

Figure 6A:
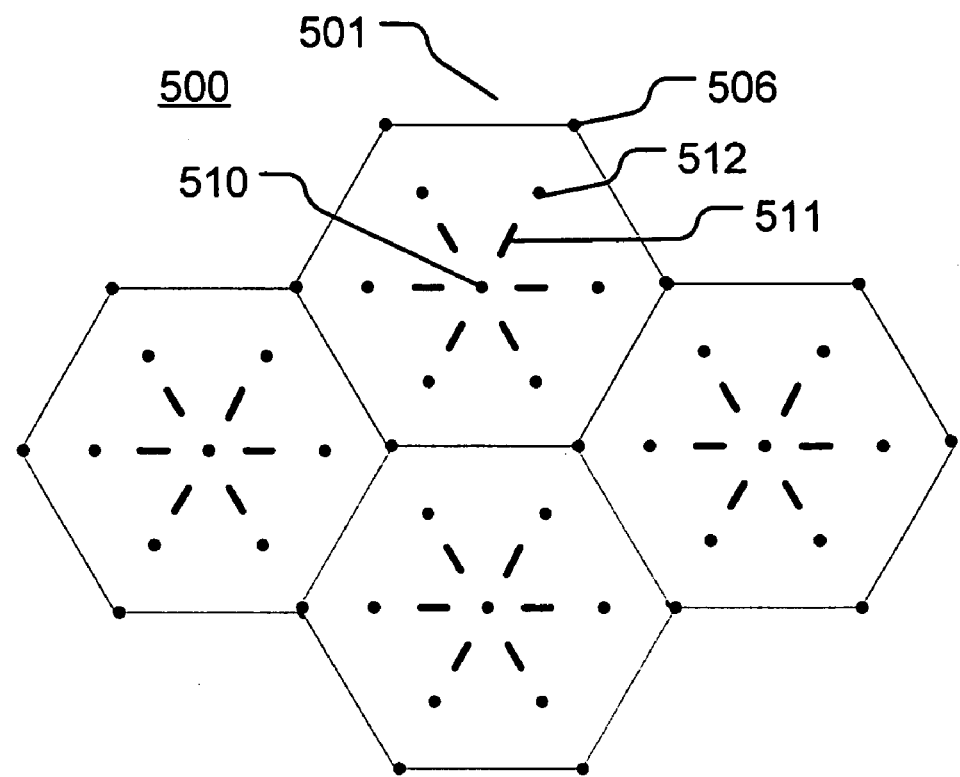
FIGS. 6A and 6B illustrate exemplary arrangements of a plurality of detectors according to the second exemplary embodiment.
Figure 6B:
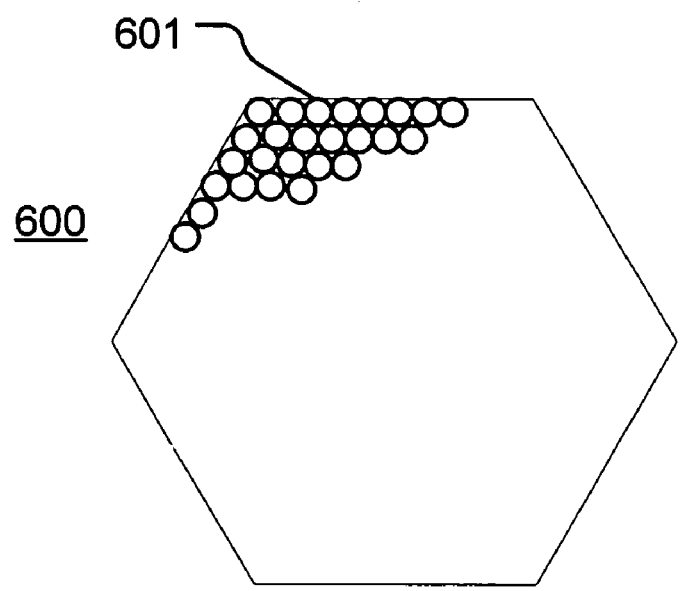

As illustrated in FIG. 6A, an array 500 of small detector modules 501 can be configured to approximate one or more regular geometric shapes, in this instance, hexagons. As indicated in FIG. 6, each of the detector modules 501 will typically include a single anode conductor 510 is surrounded by, for example, a plurality of induction wires 511 that are themselves surrounded by a shielding array 512. A cathode array 506 surrounds the shielding array 512 and can be used to establish a drift field with an active drift region between the cathode array and the shielding array. A plurality of these small detector modules can then be assembled in an array, as suggested in FIG. 6A, for collectively monitoring relatively large areas and/or volumes while maintaining the reduced dead time and reduced "pile-up" of multiple events provided by the reduced dimensions of the detector modules 501. Similarly, as illustrated in FIG. 6B, a plurality of generally cylindrical detector modules 601 corresponding to the exemplary embodiments illustrated in FIGS. 5A-5C can be assembled into a larger array 600, in this instance a hexagon. A plurality of the larger arrays 600 can, in turn, be used to form even larger arrays (not shown).

For the exemplary embodiment illustrated in FIGS. 5A-5C, for example, a suitable configuration may include a central region between the anode 410 and the shielding array having a diameter of about 6 mm diameter with a total cell or detector diameter on the order of 2.6 cm. Under a drift field of strength similar to that used in the previous detector arrangement as illustrated in FIGS. 1A and 1B, such a configuration could produce a maximum drift time of approximately 6.5 μs. This arrangement or others capable of producing similar drift times, therefore, can accommodate increased rates of radiation exposure while maintaining three-dimensional spatial resolution of less than about 1 mm.

The small cell detector cylindrical configuration as illustrated in FIGS. 5A-5C is particularly suited to high rate coincidence measurements such as commonly employed in positron emission tomography (PET). Prompt scintillation light signals used for triggering the device also narrow the coincidence window used for selecting valid pairs of annihilation gamma rays, thereby reducing the selection of random or accidental events. The position dependent light signal derived from an array of light sensors as described in Bryman II can be correlated with the position sensitive 3D ionization data to improve the overall precision with which the gamma ray interaction events can be detected and located within the detector, thereby reducing noise and increasing the accuracy of the data subsequently used to generate an image of the scanned object.

Exemplary embodiments of the invention include a triggerable detector for measuring the energy of an interaction, the position of the interaction in three dimensions and the angle of emission of ionization electrons generated during the interaction by energetic particles such as low energy gamma rays. The basic detector includes an ionization chamber in which gamma rays and/or other charged particles produce ionization that can measure the position of the ionization event, including multiple interactions, in three dimensions using only a one dimensional array of wires.

The ionization detector incorporates a material, typically a fluid such as liquid or gaseous xenon or krypton in which detectable scintillation light will be produced in combination with ionization electrons by the interaction of an energetic particle in the material. The ionization detector also includes conductors arranged and biased to produce an electrical drift field within the material that causes the ionization electrons to drift, preferably with little attenuation or disturbance, toward collection electrodes such as wires. All three dimensions of the interaction point are measured simultaneously with comparable resolution, approximately 1 mm or less, thereby reducing or eliminating parallax errors resulting from varying resolutions along different axes.

Gamma rays convert to charged particles (photo-electric effect, pair production or Compton scattering) in the detector material. This conversion also emits light energy that is detected by photodetectors arranged around the ionization chamber. A one-dimensional collection electrode array may be used for localizing the position of the ionization interaction in two dimensions with variation in the timing of the arrival of the ionization electrons relative to the scintillation signal time providing an indication of the magnitude of the third dimension. The full collected ionization signal determines the energy deposited by the gamma ray interaction with additional information on the energy deposit being provided by the amplitude of the collected light signal.

In addition to detecting the position and energy of single interactions of gamma rays, multiple interaction events such as contained Compton scatters can be used to obtain the direction of individual gamma rays. In this mode multiple coincident triggers may be used to activate more than one region of the detector so that a complete history of the event can be recorded resulting in reconstruction of the angle of the gamma ray.

The spatial resolution of the ionization detectors described above depend on the amount of ionization, the drift speed, the readout electronics (time resolution) for the drift direction coordinate, and on the angle of inclination of the induction array, segmentation, and readout methods. The resolution requirements typically on the order of less than 1 mm may be achieved because the light signal from liquid noble material detectors relatively fast (typically 1 ns) compared to the timing of the induction signal resulting from drift velocities on the order of (0.2 cm/μs) and diffusion effects which are known to be relatively small. Similarly, spatial resolutions of 1 mm in the non-drift directions are also known to achievable by commonly employed techniques.

Several other techniques for providing the spatial coordinate of ionization along an anode collection wire or induction wire are well known. These techniques have included end-to-end amplitude measurements using resistive wires and measurements of the end-to-end timing differences. The timing technique is generally restricted to poor (several cm) spatial resolution due to high signal propagation speeds. The amplitude technique may have resolutions of several percent of the wire length but spatial resolution is highly sensitive to the absolute signal size whereby resolutions of several mm have been achieved for gas multi-wire proportional or drift chambers having sufficiently high gain.

Unlike the known techniques and detector configurations, however, the present invention, as detailed above, utilizes a uni-dimensional array of induction wires arranged at an angle relative to the anode to obtain improved three-dimensional information for detecting ionization resulting from low energy gamma rays or x-rays. The present invention may provide improved position resolution and more uniform detector response. The operation of exemplary detectors according to the present invention also exhibits reduced dependence on the wire length, and may even be substantially independent of wire length, and allows the three spatial coordinates of the gamma ray interaction to be determined accurately and unambiguously with a reduced number of active nodes. Indeed, the active nodes may be configured as an essentially one-dimensional array with single end readout of signals.

These modules may be arranged and configured to cover very large areas and volumes while providing high resolution, high detection efficiency and modest cost by employing a substantially uni-dimensional array. Further, the construction of the detectors described in the exemplary embodiments including the materials, dimensions, angles, orientation of the induction array, and detector types used should not be considered limiting. Indeed, those of ordinary skill in the art will appreciate that various combinations of materials and configurations in addition to the exemplary embodiments may be fabricated and utilized without departing from the scope of the present invention while constructing detectors that may be tailored for a large range of ionization detector applications.

The selection of materials, dimensions and geometries consistent with the present invention suitable for a particular application will generally be within the ability of one of ordinary skill in the art. For example, the converter and detector materials may include other than liquid or gaseous xenon or krypton or argon may also be appropriate. Many other geometries making use of the uni-dimensional array to obtain three dimensional spatial information of high precision may also be employed.

What is claimed is:

1. A method for determining the position of energetic particle interactions within a detector, the method comprising:

providing a drift medium within the detector;

allowing an energetic particle to interact with the drift medium and thereby produce ionization electrons at an interaction location;

generating an interaction signal indicating that an interaction between the energetic particle and the drift medium has occurred;

establishing a drift field within the drift medium whereby the ionization electrons are directed toward an induction array and a collector, wherein the induction array comprises a plurality of conductive elements mounted at an offset angle relative to the collector;

providing a shield array between the interaction location and the induction array;

opening a portion of the shield array corresponding to a first plurality of coordinates for a period of time during which the ionization electrons are expected to reach the shield array, thereby selectively allowing the ionization electrons to pass through the shield array and move toward a portion of the induction array; and detecting the ionization electrons at the induction array for determining at least one coordinate corresponding to the interaction location.

2. The method according to claim 1, wherein:
the drift medium is a scintillating liquid.

3. The method according to claim 2, wherein:
the drift medium is at least one of liquid xenon (Xe), liquid krypton (Kr) and liquid argon (Ar).

4. The method according to claim 1, wherein:
the drift medium is a noble gas.

5. The method according to claim 1, wherein:
the collector comprises a two-dimensional collection electrode array.

6. The method according to claim 1, wherein:
the drift field induces movement of the ionization electrons through the drift medium at a drift velocity.

7. The method according to claim 1, wherein:
the drift medium is liquid xenon; and
the drift field is approximately 1 kV/cm.

8. The method according to claim 1, wherein:
the drift medium is liquid xenon; and
the drift field produces drift velocity of approximately 0.2 cm/µs in the ionization electrons.

9. The method according to claim 1, wherein:
the drift medium is a scintillating medium and the interaction between the energetic particle and the drift medium emits scintillation light, the scintillation light being detected by photodetectors provided around the drift medium to generate the interaction signal;
and further wherein the photodetectors are selected from a group consisting of photomultiplier tubes, position sensitive photo multipliers, photodiodes, avalanche photodiodes, hybrid photodiodes and visible light photodetectors.

10. The method according to claim 1, wherein:
the portion of the shield array is opened based on an expected time of arrival of the ionization electrons at the collector as determined from the interaction signal.

11. The method of claim 9, further comprising:
collecting data from the photodetectors and the collector; and
processing the collected data off-line to calculate a three-dimensional approximation of the interaction location.

12. A gamma ray detector for determining the position of gamma ray interaction comprising:
an active region containing a drift medium that will emit ionization electrons in response to an interaction between the drift medium and a gamma ray at an interaction location;
a device for detecting the interaction for setting an initial time in response to the interaction;
an energizable array for inducing a drift field in the drift medium, the drift field being sufficient to induce the ionization electrons to move through the drift medium at a drift velocity toward a selective shield array, an induction array and a collector, wherein the induction array comprises a plurality of conductive elements arranged at an offset angle relative to the shield array and the collector;
an actuation system for selectively deactivating a portion of the shield array based on a first interaction location calculated in response to detection of the interaction and the induced drift velocity of the ionization electrons, thereby allowing the ionization electrons to pass through the shield array; and
a processor for calculating at least one coordinate of the interaction location based on detection of the ionization electrons by the induction array.

13. The gamma ray detector according to claim 12, wherein:
the drift medium is a noble liquid.

14. The gamma ray detector according to claim 12, wherein:
the drift medium is a gas through which ionization electrons can be induced to move with a drift velocity of at least 0.1 cm/µs.

15. The gamma ray detector according to claim 12, wherein:
the energizable array is biased to induce a drift field sufficient to move the ionization electrons through the drift medium at a substantially constant drift velocity.

16. The gamma ray detector according to claim 13, wherein:
the drift medium is liquid xenon; and
the drift velocity is about 0.2 cm/µs.

17. The gamma ray detector according to claim 12, wherein:
the drift medium is a scintillating medium and the device for detecting the interaction includes a plurality of photodetectors arranged around the drift medium, the photodetectors being selected from a group consisting of photo-multiplier tubes, position sensitive photo multipliers, photodiodes, avalanche photodiodes, hybrid photodiodes and visible light photodetectors.

18. The gamma ray detector according to claim 12, wherein:
the energizable array surrounds the shield array;
the shield array surrounds the collector, wherein the energizable array, the shield array and the collector are configured in a substantially parallel and coaxial arrangement;
the active region is an annular region between the energizable array and the shield array; and
the induction array is arranged between the shield array and the collector, elements of the induction array being arranged at an offset angle relative to the collector whereby a distance between an element of the induction array and the collector may be represented by a linear function of a z-axis position along the collector.

19. A gamma ray detector system comprising:
a plurality of gamma ray detectors according to claim 18;
the plurality of gamma ray detectors being arranged in an array within a gamma ray detector module; and
a plurality of gamma ray detector modules arranged in a predetermined pattern around a target region, wherein the target region is arranged and configured for positioning an object relative to the gamma ray detector modules.

20. The method according to claim 1, wherein the interaction signal is used to determine a window containing an x-y region and time period for the arrival of the ionization electrons at the collector.

* * * * *